Patented Jan. 24, 1928.

1,657,079

UNITED STATES PATENT OFFICE.

HERBERT C. GORE, OF MOUNT VERNON, NEW YORK, ASSIGNOR TO THE FLEISCHMANN COMPANY, OF NEW YORK, N. Y., A CORPORATION OF OHIO.

MALTOSE PRODUCT AND PROCESS OF PRODUCING SAME.

No Drawing. Application filed March 30, 1925, Serial No. 19,540, and in Australia November 28, 1924.

This invention relates to a process of producing maltose concrete from starch or starch bearing materials through the action of diastase of malt or other diastatic agent, and has as a general object the production of a product of high quality in a more convenient and economical manner than heretofore.

A more specific object of the invention is to provide an improved process of preparing a substantially water-white maltose product having a very mild flavor and excellent keeping qualities, such product being prepared optionally either in the form of a syrup, fondant, or dry sugar.

Other objects of the invention will in part be obvious and will in part appear hereinafter.

The invention accordingly comprises the several steps and relation and order of one or more of such steps with respect to each of the others, and the product possessing the features and properties which are exemplified in the following detailed disclosure, and the scope of the application of which will be indicated in the claims.

Attempts have heretofore been made to prepare such maltose products from starch or starch bearing materials, but have been unsuccessful due to improper methods of control and procedure, particularly in regard to purification of raw materials, control of temperature and acidity, and infection by extraneous micro-organisms, whereby the product obtained has a pronounced color and taste, and very poor keeping qualities.

In the practice of the present invention such undesirable results are avoided and a product of high quality is attained by the proper coordination of the various steps of procedure and control which will be pointed out hereinafter.

The improved process utilizes as a carbohydrate source either starch as such or in the form of ground and preferably degerminated corn, rice, hominy or other suitable starch bearing materials. In order to insure a suitable final product such starchy substances are so treated as to remove all soluble material therefrom, particularly the nitrogenous bodies, which if allowed to remain would produce undesirable characteristics in the final product. Such purification of the starch bearing materials may be accomplished either by washing with water alone, or if desired, by treating a suspension of the starch in water with a solution of about 0.5% potassium permanganate (based on the weight of starch used), reducing the excess by treatment with sulfur dioxide, and thoroughly washing the treated material.

The diastase to be used may be obtained from malt or other diastase containing material and it has been found preferable to use a malt high in active diastase and free from empyreumatic substances which impart either taste or color to the final product. A suitable malt, for example, is that known as pale distiller's malt.

From these materials a mash of any desired size may be prepared using approximately seven (7) parts of water to three (3) parts of starch and from 1% to 2% of malt, based on the dry weight of the starch. At this stage it has been found to be particularly important to adjust the natural acidity of the mash by the addition of suitable alkaline or acid materials, for example, sodium bicarbonate, or a mineral acid, so that a slight acidity is present. The degree of slight acidity which has been found to be preferable is that which corresponds to a hydrogen-ion concentration expressed as (pH) of between 4.6 to 6.0.

The liquefaction of the mash thus prepared is accomplished by raising the temperature to that at which the starch begins to gelatinize, namely about 68° C., and gradually raising to about 80° C., the entire operation requiring about from 2 to 4 hours for completion. If desired, the mash may then be heated to boiling for a short time in order to insure a more complete dispersion of any remaining unliquefied starch, the mash cooled to about 65° C., ½% malt added, and the mash allowed to stand for about one hour for complete liquefaction of the newly dispersed starch.

After the step of liquefaction, the mash is saccharified by adding thereto about 5% malt (based on the weight of the starch) and maintaining the temperature at from 45° to 55° C. for a period of from five to ten days until substantially all of the liquefied starch has been converted into maltose. The completion of the saccharification step may be determined in a suitable manner, as for example by determining the specific rotatory power of the mash, which should be about 136 to 140 degrees, or by treating a small quantity of the filtrate with several volumes of alcohol, in which test the formation of a precipitate indicates that the conversion of the starch is not quite complete but that some intermediate product, for example, dextrin, is still present.

During certain of the above treatments of the materials, including the steps of washing, liquefaction and saccharification, it is desirable that the mash be protected from the action of undesirable organisms. This is particularly essential during the saccharification step by reason of the use of relatively small amounts of malt which makes necessary the increase of the length of the saccharification step. It has been found that this can best be accomplished by adding to the mash from time to time when necessary, small amounts of a suitable preservative, for example, toluene. Toluene has been found to be particularly adaptable for the reason that it not only prevents infection but is readily removed from the mash by evaporation during the concentrating step.

After the saccharification is completed the mash is filtered, with the aid of suitable filtering agents, such as ignited kieselguhr if desired. Also if deemed necessary the wort may be decolorized by passing it through any suitable decolorizing agent as for example a non-alkaline decolorizing carbon, bone char or the like. The amounts of kieselguhr and bone char which may be necessary to accomplish these results may vary from about 1% to 3% each.

The filtered and clarified wort is then evaporated, either in open kettles or in vacuo to a water-white syrup having a density of from 80° to 85° balling. This product constitutes the syrup form of the improved product of the present invention and contains about 80% to 85% solids, substantially all of which are maltose. The step of evaporation may be carried out with a minimum of time and expense, particularly because of the relatively high concentration of the wort initially obtained, such high concentration being due to the relatively small amount of water used during the mashing, as compared to the heretofore known processes.

If it is desired to obtain the product in the form of a fondant it is necessary only to inoculate the evaporated syrup with from ½% to 2% of maltose crystals, or an equivalent amount of fondant obtained from a previous mash, stirring the mash to distribute the crystals evenly and allowing it to stand in a cool place for from one to two days, at which time it will have set into a fondant form containing minute and uniformly distributed crystals.

If it is desired to obtain the product in the form of a dry sugar, this may be accomplished by dividing the fondant into small pieces, for example by slicing or chipping the same, and subjecting such particles to a curing process. This curing process may consist particularly in subjecting the particles to a suitably tempered heat, for example about 50° C., until the particles become dry and may be ground into a dry sugar. During this curing process the crystal formation is apparently increased and substantially all of the gumminess disappears.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process of manufacturing a maltose product from a suitably purified starch source, which includes preparing an aqueous starchy suspension, adjusting the acidity thereof to from 4.6 to 6.0 pH., liquefying the suspension by heating in the presence of a diastatic agent, diastatically saccharifying the liquefied mixture, filtering, and concentrating the liquid to a syrup.

2. A process of manufacturing a maltose product from a suitably purified starch source, which includes preparing an aqueous starchy suspension, adjusting the acidity thereof to from 4.6 to 6.0 pH., liquefying the suspension by treating with a diastatic agent, diastatically saccharifying the resulting mixture, filtering and concentrating the liquor, the step of saccharification being carried on in the presence of a preservative adapted to prevent infection by undesirable organisms.

3. A process of manufacturing a maltose product from a suitably purified starch source, which includes liquefying a but slightly acid aqueous starchy suspension by treating with a diastatic agent, diastatically saccharifying the resulting mixture, filtering and concentrating the liquor, the step of saccharification being carried on in the presence of toluene.

4. A process of manufacturing a maltose product from a suitably purified starch source, which includes liquefying a but slightly acid aqueous starchy suspension by treating with a diastatic agent, diastatically saccharifying the resulting mixture, filtering and concentrating the liquor, each of the stops prior to concentrating being carried on in the presence of toluene as a preservative.

5. A process of manufacturing a maltose product from a suitably purified starch source, which includes preparing an aqueous starchy suspension, adjusting the acidity thereof to from 4.6 to 6.0 pH., liquefying the suspension by heating in the presence of a diastatic agent, diastatically saccharifying the liquefied mixture, filtering, concentrating the liquid to a syrup, inoculating the concentrated syrup with maltose crystals and allowing the mixture to solidify to a fondant-like mass.

6. A process of manufacturing a maltose product from a suitably purified starch source, which includes preparing an aqueous starchy suspension, adjusting the acidity thereof to from 4.6 to 6.0 pH., liquefying the suspension by heating in the presence of a diastatic agent, diastatically saccharifying the liquefied mixture, filtering, concentrating the liquid to a syrup, allowing the syrup to solidify to a fondant-like mass, subdividing the mass, curing the particles to promote further crystal formation, and comminuting to a sugar-like crystalline mass.

7. A process of treating fondant-like masses of maltose which comprises subdividing the same, curing the divided particles in suitably tempered air to promote crystalline formation, and comminuting the mass to a sugar-like crystalline mass.

In testimony whereof I affix my signature.

HERBERT C. GORE.